United States Patent
Schlosser et al.

[11] Patent Number: 6,102,028
[45] Date of Patent: Aug. 15, 2000

[54] SMOKER ATTACHMENT FOR A BARBECUE GRILL

[75] Inventors: Erich J. Schlosser; Edna Schlosser; Robert T. Stephen, all of Barrington, Ill.

[73] Assignee: Weber-Stephen Products Co., Palatine, Ill.

[21] Appl. No.: 09/372,703

[22] Filed: Aug. 11, 1999

[51] Int. Cl.[7] .............................. A47J 37/00; F24C 3/00
[52] U.S. Cl. ..................... 126/41 R; 126/25 R; 126/540; 99/482
[58] Field of Search ............................... 126/25 R, 41 R, 126/26, 540, 541; 99/482, 414, 416, 417, 421 H, 424, 448, 449, 450, 481, 473, 483, 340; 220/601, 608, 623, 484, 676, 3.3; 229/120, 918; D7/667; 210/464, 469

[56] References Cited

U.S. PATENT DOCUMENTS

| | | | |
|---|---|---|---|
| D. 312,560 | 12/1990 | Williamson | D7/667 |
| 597,535 | 1/1898 | Bliss | 126/26 |
| 822,921 | 6/1906 | Chatfield | 126/26 |
| 1,118,501 | 11/1914 | Laughlin | 126/541 |
| 1,779,453 | 10/1930 | Taylor . | |
| 3,002,444 | 10/1961 | Hoebing . | |
| 3,081,692 | 3/1963 | Sorensen . | |
| 3,224,357 | 12/1965 | Rubens . | |
| 3,586,518 | 6/1971 | Folmar . | |
| 3,611,911 | 10/1971 | Martin . | |
| 3,651,596 | 3/1972 | Orsing . | |
| 3,693,534 | 9/1972 | Martin . | |
| 3,713,579 | 1/1973 | Chaffers | 229/120 |
| 3,809,056 | 5/1974 | Snelling . | |
| 3,858,755 | 1/1975 | Tellen | 220/484 |
| 4,130,052 | 12/1978 | Jacobson . | |
| 4,140,049 | 2/1979 | Stewart . | |
| 4,163,503 | 8/1979 | McKinnon | 220/484 |
| 4,175,691 | 11/1979 | Cornell et al. | 229/120 |
| 4,190,677 | 2/1980 | Robins . | |
| 4,201,125 | 5/1980 | Ellis . | |
| 4,374,489 | 2/1983 | Robbins . | |
| 4,467,709 | 8/1984 | Anstedt . | |
| 4,471,757 | 9/1984 | Rogers | 126/541 |
| 4,495,860 | 1/1985 | Hitch et al. . | |
| 4,512,249 | 4/1985 | Mentzel . | |
| 4,665,891 | 5/1987 | Nemec et al. . | |
| 4,690,125 | 9/1987 | Beller . | |
| 4,697,506 | 10/1987 | Ducate, Jr. . | |
| 4,700,618 | 10/1987 | Cox, Jr. . | |
| 4,721,037 | 1/1988 | Blosnich . | |
| 4,770,157 | 9/1988 | Shepherd et al. . | |
| 4,770,339 | 9/1988 | Weimer | 229/120 |
| 4,773,319 | 9/1988 | Holland . | |
| 4,777,927 | 10/1988 | Stephen et al. . | |
| 4,823,684 | 4/1989 | Traeger et al. . | |
| 4,830,189 | 5/1989 | Jones | 229/918 |
| 4,850,333 | 7/1989 | Dellrud et al. . | |
| 5,070,776 | 12/1991 | Schlosser et al. . | |
| 5,097,817 | 3/1992 | Dodgen . | |
| 5,163,359 | 11/1992 | McLane, Sr. . | |
| 5,167,183 | 12/1992 | Schlosser et al. . | |
| 5,195,423 | 3/1993 | Beller . | |
| 5,535,941 | 7/1996 | Garza | 229/918 |
| 5,719,377 | 2/1998 | Giebel et al. . | |

Primary Examiner—Ira S. Lazarus
Assistant Examiner—David Lee
Attorney, Agent, or Firm—Wallenstein & Wagner, Ltd.

[57] ABSTRACT

A smoker attachment for heating and burning smoker particles in a barbecue grill. The smoker attachment includes a housing having a side wall, end wall, and bottom wall fining a cavity therein. The bottom wall of the housing has a plurality of openings and the side walls have a plurality of corresponding cutouts adjacent the bottom wall such that the cutouts in the side walls cooperate with the openings in the bottom wall. The openings provide access to the cavity of the housing such that a conductive member within the barbecue grill is able to contact the housing adjacent the opening to position the housing within the bottom chamber of the barbecue grill. The conductive member further passes through the opening of the housing into the cavity of the housing to define a portion of the perimeter of the cavity for directly contacting and heating the smoker particles within the housing.

17 Claims, 5 Drawing Sheets

SMOKER ATTACHMENT FOR A BARBECUE GRILL

DESCRIPTION

1. Technical Field

The present invention relates generally to outdoor cooking devices and, more particularly, to a smoker assembly for gas grills.

2. Background of the Invention

Barbecue grills have become increasingly popular in recent years because of the interest in outdoor cooking. Conventionally, gas grills include a burner assembly adjacent the lower portion of a firebox with a cooking grid supported along the upper edge and lava rock located between the cooking grid and the burner assembly. The lava rock, acting as a form of a conductive member, absorbs the heat from the burning gas and provides a generally uniform heat producing means for the food being cooked. Grease and other combustible particles, however, build up on the lava rock and cause undesirable flare-ups and hot spots within the grilling cavity.

Accordingly, the Assignee of the present invention previously developed a gas grill which eliminates the need for lava rock. Such a grill is disclosed in U.S. Pat. No. 4,677,964. The gas grill disclosed therein has revolutionized the gas grill industry by eliminating the need for the lava rock, which often caused flare ups and which had to be replaced periodically due to degradation. The gas grill disclosed in the '964 patent utilizes sear bars which are positioned between the cooking grid and the gas burners to vaporize any greases that emanate from the food being cooked. Accordingly, the food is cooked utilizing a generally indirect grilling method which substantially eliminates flare ups and provides for an initial searing of the outside of the food.

Following the remarkable degree of consumer acceptance for the commercial embodiment of the invention recited in the '964 patent, the Assignee developed a variety of accessories for such grill, including a smoker assembly which is described in U.S. Pat. No. 5,167,183 and is similarly assigned to the Assignee of the present invention. The smoker assembly of the '183 patent comprises a generally rectangular housing having a bottom wall made of a perforated metal material. The smoker housing is situated on the apexes of the sear bars of the barbecue grill. As such, the heat for igniting the wood chips in the smoker assembly is generated substantially by convection means through the perforations in the smoker housing assembly. Accordingly, it often takes a longer period of time than desired to adequately heat the wood chips to produce the necessary smoke.

Other smoker apparatuses include a smoker box located over a designated burner tube. Such apparatuses necessarily require an additional burner which substantially adds to the cost of the barbecue grill. Such apparatuses also require the smoker box to first heat up to a minimum temperature before the wood chips therein heat up and produce smoke. As such, these types of smoker apparatuses suffer similar drawbacks to prior smoker devices.

Accordingly, there is a need for an inexpensive and effective smoker assembly for a barbecue grill that heats up the chips located therein more quickly and efficiently.

SUMMARY OF THE INVENTION

The smoker attachment of the present inventions provides a removable assembly for a barbecue grill for heating and burning smoker particles to produce flavored smoke in the chamber of the barbecue grill. Generally, the barbecue grill utilized in conjunction with the smoker attachment includes a bottom chamber having a cooking grid, a burner assembly, and a conductive member between the burner assembly and the cooking grid. The smoker attachment includes a container having a plurality of sides and a bottom defining a cavity therebetween. The bottom of the container has at least one opening such that a portion of the conductive members in the grill chamber are positioned within the cavity of the container to heat smoker particles in the container.

According to another aspect of the present invention, the container is adapted to have a portion of the conductive member contacting the container adjacent the opening to support and position the container within the bottom chamber of the barbecue grill. The container is further adapted to have a portion of the conductive member pass through the opening of the container and into the cavity of the container to heat smoker particles within the container.

According to another aspect of the present invention, the side walls of the container have corresponding cutouts which communicate with the openings in the bottom of the container.

According to another aspect of the present invention, the container is adapted to have a portion of a perimeter of the interior cavity defined by the conductive member located within the opening of the bottom wall of the container, thereby decreasing the interior volume of the container while increasing the surface area for contacting the particles in the container. As such, a portion of the conductive member acts as a portion of the bottom wall at the opening thereof.

According to yet another aspect of the present invention, the smoker attachment further comprises a lid hingedly connected to the container. The lid provides access to the cavity of the container when in an open position. The lid further has a plurality of openings therein for allowing smoke generated from the smoker particles to escape from the smoker attachment when the lid is in a closed position.

Accordingly, a smoker attachment made in accordance with the present invention provides an inexpensive and easily manufactured assembly which eliminates the drawbacks of prior ash catcher assemblies.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION OF THE PREFERRED EMBODIMENT

Figure 1:
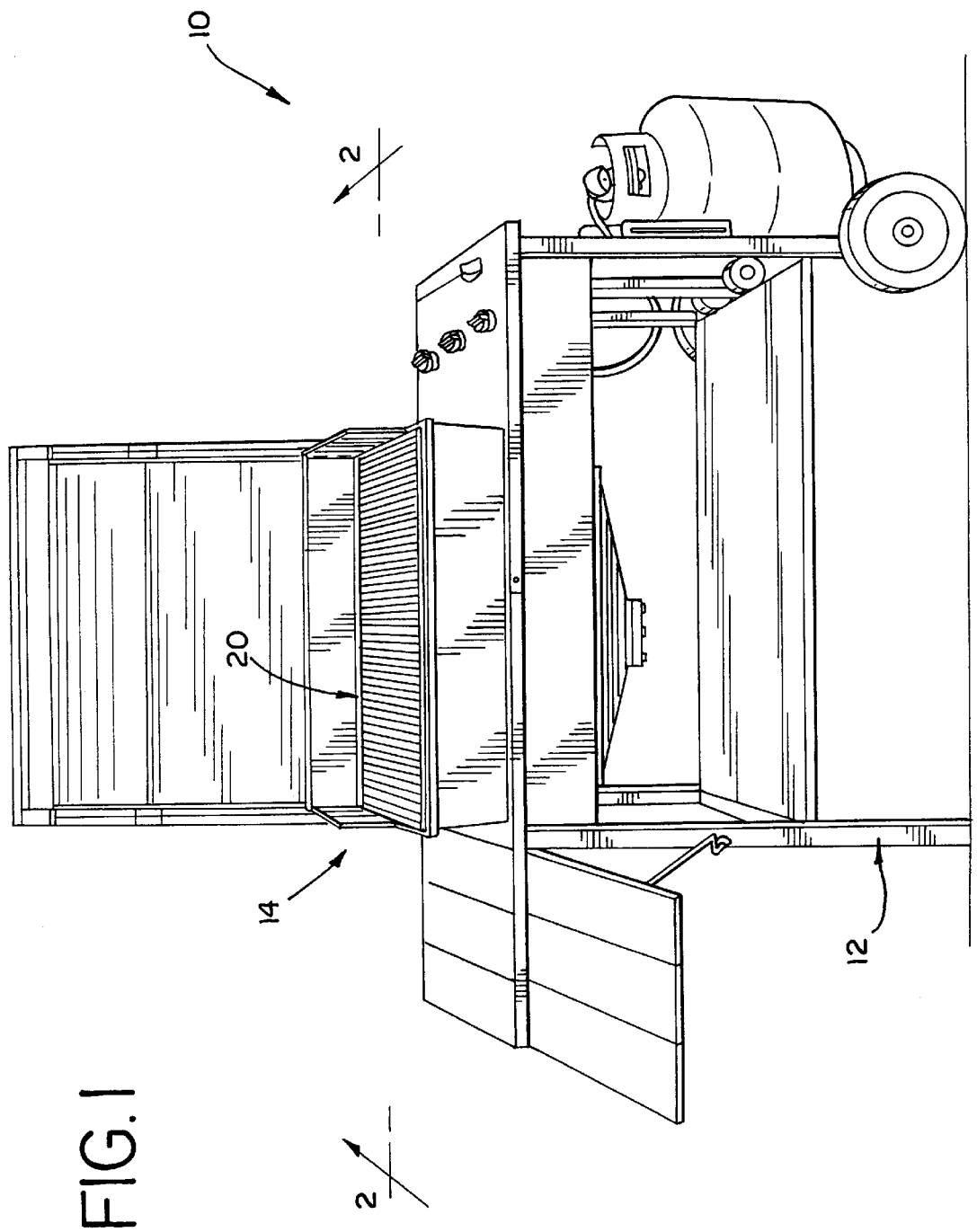
FIG. 1 is a perspective view of a barbecue grill having the features of the present invention incorporated therein.

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiments illustrated.

Figure 2:
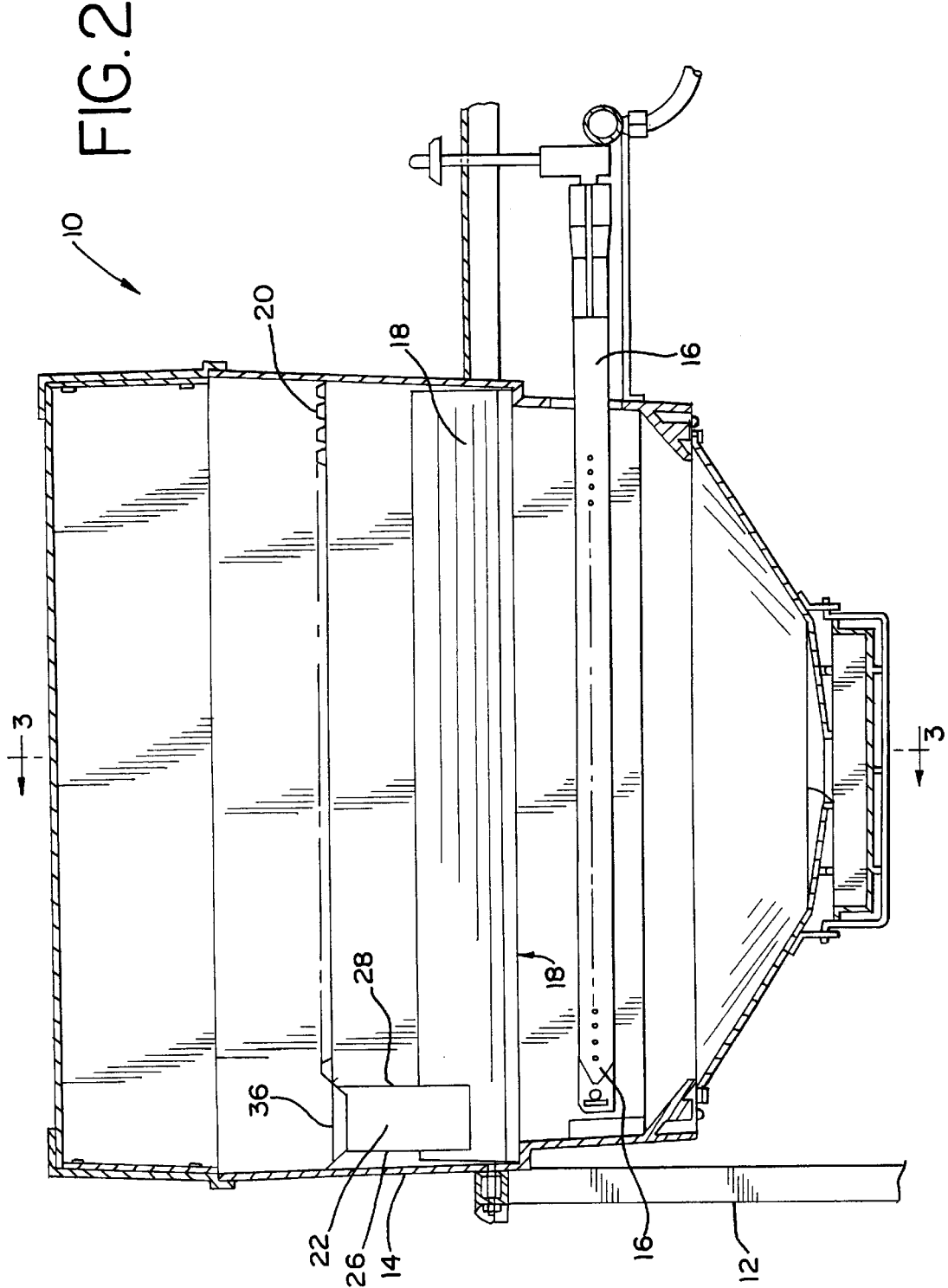
FIG. 2 is a front cross-sectional view, as viewed along line 2—2 of FIG. 1.
Figure 3:
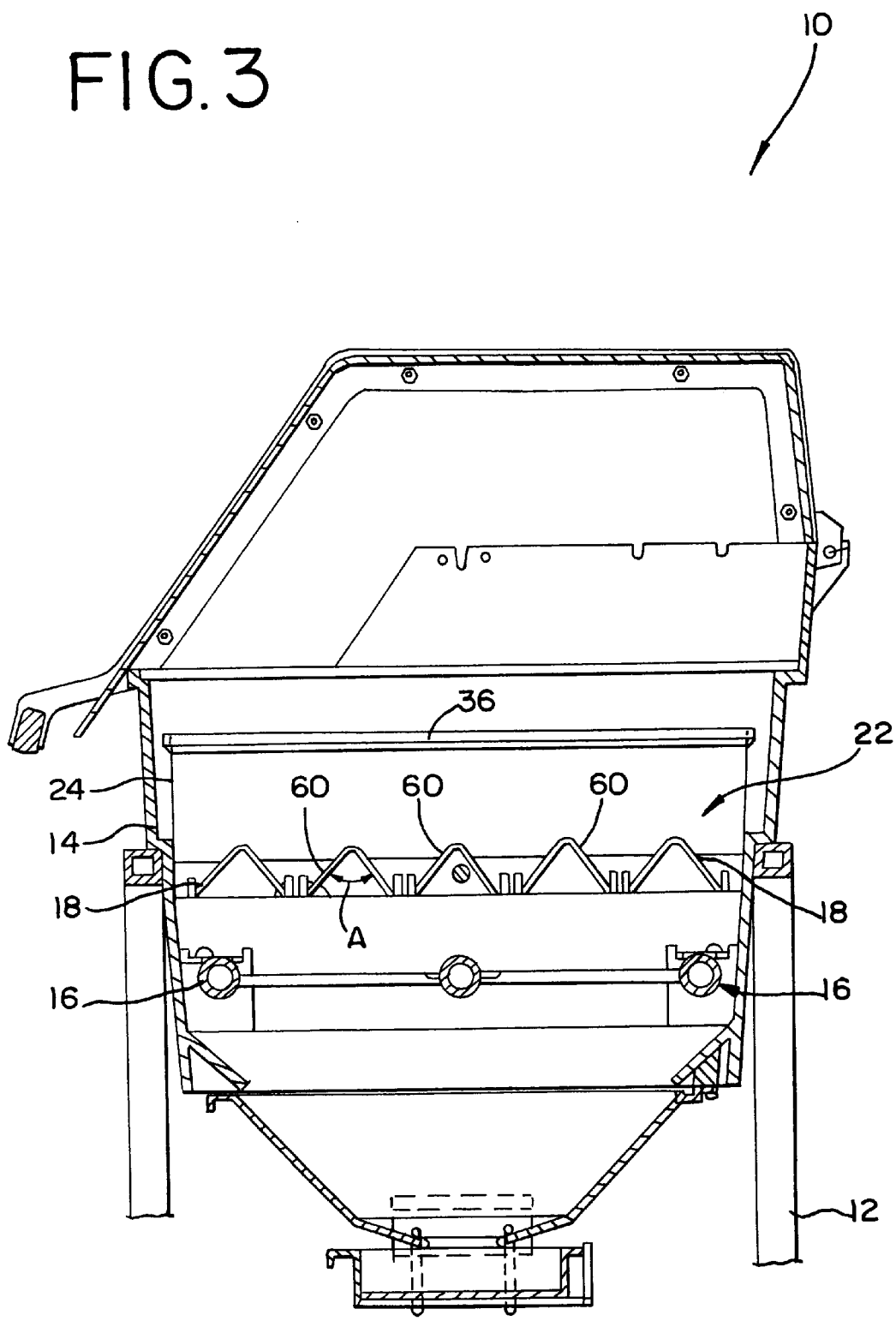
FIG. 3 is a side cross-sectional view, as viewed along line 3—3 of FIG. 2.

Referring now in detail to the Figures, and initially to FIGS. 1–3, there is shown a gas barbecue grill 10 as disclosed in U.S. Pat. No. 4,677,964, assigned to the Assignee of the present invention, and incorporated herein by reference. The barbecue grill 10 generally includes a rectangular frame work 12 and a cooking vessel 14 supported on the frame 12. The cooking vessel 14 has a lower gas burner assembly 16, an intermediate conductor assembly 18, and an upper cooking grid 20. In the preferred embodiment of the barbecue grill 10, the intermediate conductor assembly 18 comprises a plurality of inverted "V"-shaped sear bars that cause evaporation of greases that fall from the food on the cooking grid 20. As illustrated best in FIG. 2, the sear bars 18 traverse lengthwise, from one side of the cooking vessel 14 to the other side of the cooking vessel. Each sear bar 18 consists of a pair of inclined walls that define an included angle A to produce the desire function of the sear bars. The included angle A is preferably less than 100°, and most preferably is between 30° and 50°. The inverted "V"-shaped sear bars 18 are preferably formed from a metal material having good heat conducting characteristics, such as cold-rolled steel, which has a porcelain enamel coating thereon. Because of the inverted "V"-shaped nature of the sear bars 18, and the fact that they are formed of metal which has good heat conduction, the heat from the burner assembly 16 will be trapped between the sidewalls of the sear bar 18 and will quickly heat the entire sear bar 18 to an elevated temperature to further heat the cooking vessel 14.

According to the present invention, a smoker attachment 22 is provided for a barbecue grill 10 in order to assist in providing a desired flavor to the food being cooked on the barbecue grill 10. While a gas barbecue grill employing burner tubes and inverted "V"-shaped sear bars is described herein in conjunction with the smoker attachment, it is understood that the present invention is to be utilized with any type of barbecue grill having a bottom chamber with an open top, a bottom, a heat source located in the bottom or cooking chamber, and a conductive member positioned between the heat source and the top of the bottom chamber.

The smoker attachment 22 of the present invention is illustrated in FIGS. 4–6B, and generally comprises a rectangular container or housing 24 having a plurality of spaced side walls 26,28, end walls 30,32 and a bottom wall 34. The container 24 additionally has a lid or top member 36. The space or volume of the interior of the container (i.e., that space between the lid 36, side walls 26,28, end walls 30,32, and bottom 34 of the container 24) defines a cavity 38 therebetween. In the preferred embodiment, the side walls 26,28, end walls 30,32 and bottom 34 are integrally formed from one sheet of material. Further, in the preferred embodiment each of the components making up the container 24 of the smoker attachment 22 is manufactured of a porcelain-enamel coated steel, however, other materials including stainless steel and aluminum may be utilized. Additionally, the side walls 26,28 and end walls 30,32 of the container 24 are preferably manufactured to maintain a solid wall without any holes or apertures (except for the cutouts described further herein), while the bottom 34 is manufactured with a plurality of smaller apertures 37 and larger openings 40. As such, in preparing the container 24 of the present invention, the side walls 26,28, end walls 30,32 and bottom 34 of the container are preferably integrally manufactured from one sheet of raw stock and then bent and welded as required to form the final container 24.

Figure 6A:
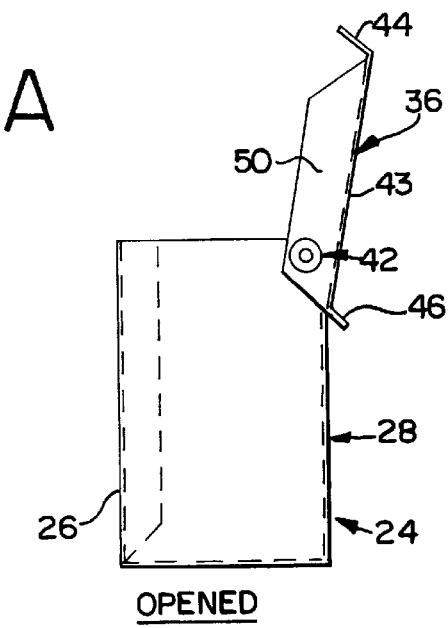
FIG. 6A is a side elevation view of the smoker assembly of the present invention in the open position.
Figure 6B:
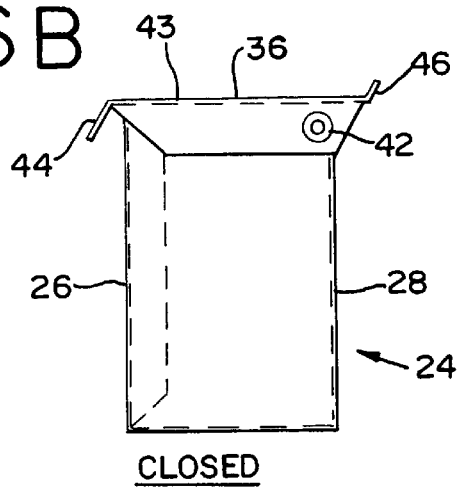
FIG. 6B is a side elevation view of the smoker assembly of the present invention in the closed position; and, FIG. 7 is a partial side elevation view of the lid of the present invention.
Figure 7:
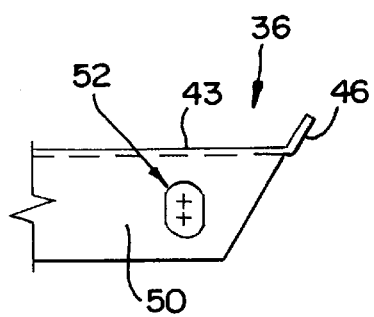

The lid or cover 36 of the container 24 is hingedly connected to the side walls 26,28 of the container 24 by a pair of pivot pins or rivets 42 depending from an upper portion of the side walls 26,28. As shown in FIGS. 6A and 6B, the lid 36 is capable of being placed in an open position (FIG. 6A), and a closed position (FIG. 6B). In the open position the lid 36 provides access to the cavity 38 of the container 24 for inserting additional smoker chips. Generally, the lid 36 comprises a flat upper surface 43, a downward extending lip 44, an upward extending lip 46, and two opposed transverse side walls 48,50. The flat upper surface 43 of the lid 36 generally has a plurality of apertures 52 therein for allowing smoke generated from the heated smoker particles to escape out of the container 24 (through the apertures 52) and into the cooking vessel 14 of the grill 10. When the smoker attachment 22 is positioned in place in the cooking vessel 14 of the barbecue grill 10, the flat upper surface 43 of the container 24 is generally level with the upper cooking grid 20. The downward extending lip 44 depends from the flat upper surface 43 of the lid 36. The downward extending lip 44 not only provides a means for grasping the lid 36 in order to open the lid 36, but it also provides for proper seating of the lid 36 on the container 24. The upward extending lip 46 is located at the rear of the container 24 and is generally adjacent the sidewall of the cooking vessel 14 when the smoker attachment 22 is properly placed in the cooking vessel 14. The upward extending lip 46 further directs the smoke exiting from the container 24 into the vessel 14. The upward extending lip 46 also provides a stop for the lid 36 against the outer back sidewall 28 of the container 24 when the lid 36 opened. As illustrated in FIG. 7, the two transverse side walls 48,50 of the lid 36 each have a slot 52 for receiving the pivot pins or rivets 42 depending from the side walls 26,28. The slot 52 allows the hinged lid 36 to fully rest and be in contact with the body of the container 24 when in the closed position. Specifically, when the lid 36 is in the closed position the pivot pin 42 is able to move to the far upper end of the slot 52 to allow the lid to rest on the sidewalls 26,28 and end walls 30,32 of the container 24. The slot 52 also provides clearance when opening the lid 36.

Figure 4:
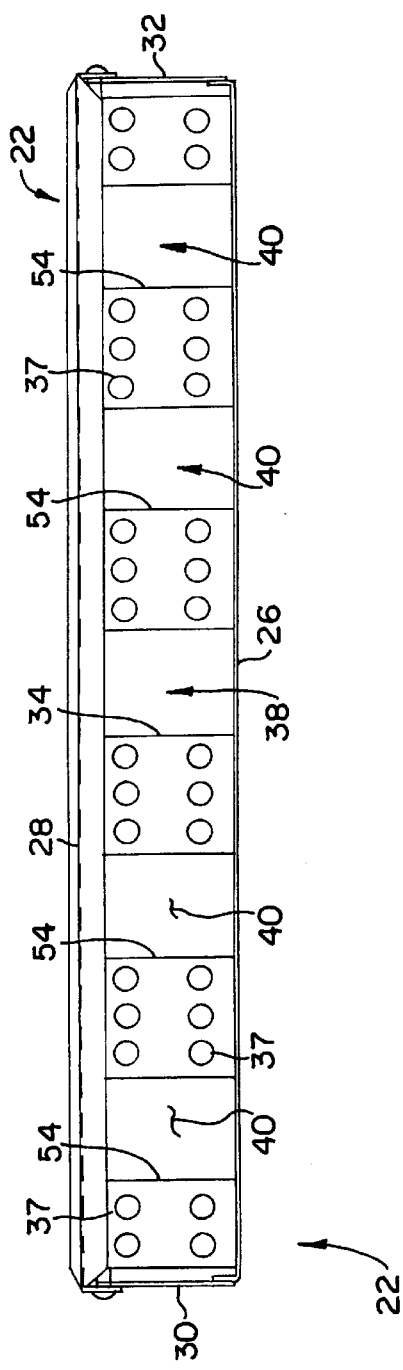
FIG. 4 is a front elevation view of the smoker assembly of the present invention.
Figure 5:
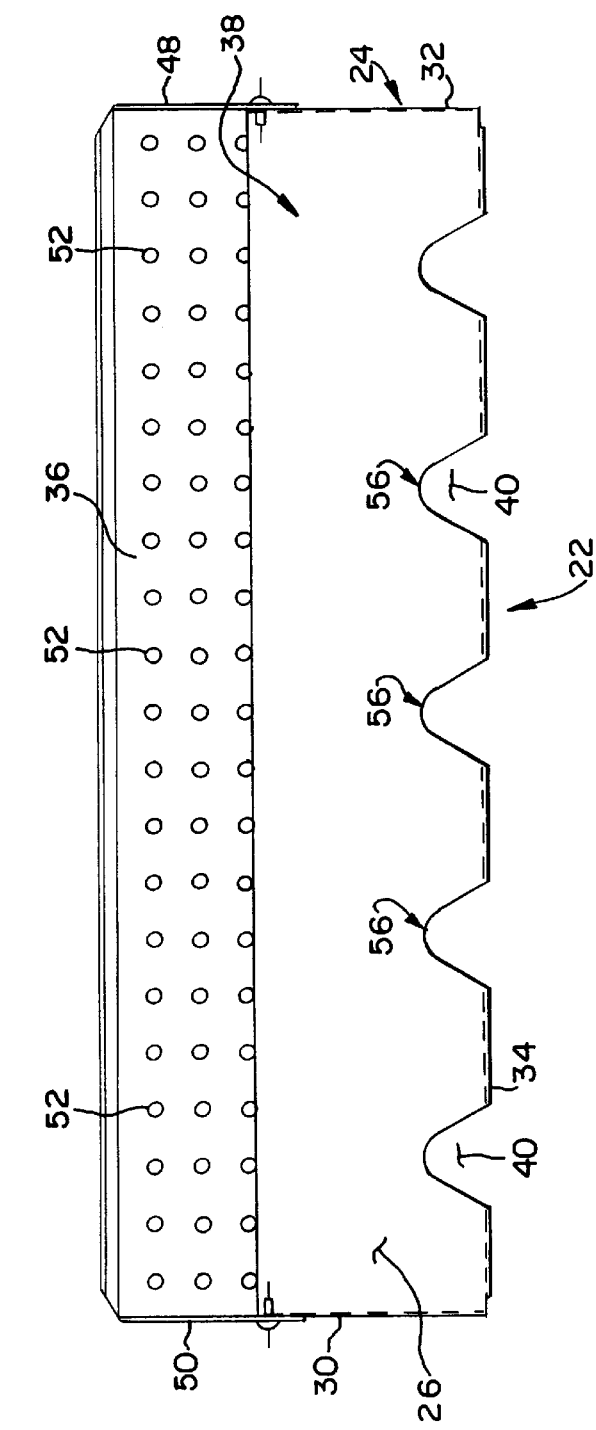
FIG. 5 is a top elevation view of the smoker assembly of the present invention.

As best shown in FIGS. 4 and 5, the bottom wall 34 of the container 24 has a plurality of openings 40 or void regions 40. In the embodiment illustrated, five openings 40 are utilized. As such, the bottom wall 34 of the container appears to be segmented in a plurality of sections 54. Each of the sections 54 may be referred to a substantially planar member 54 adjacent an opening 40. The openings 40 in the bottom wall 34 of the container 24 provide access to the cavity 38 where the smoker particles are located. Further, as explained above, each of the sections 54 of the bottom wall 34 has a plurality of smaller apertures 37. The apertures 37 allow for a small amount of air to enter the cavity 38 of the container 24, but prevent sufficient oxygen from entering the housing 24 in order to prevent ignition of the smoker particles.

The opposed side walls 26,28 of the container 24 have a plurality of corresponding cutouts 56 in each of the side walls 26,28 adjacent the bottom wall 34 of the container 24. The cutouts 56 in the respective side walls 26,28 communicate and mate with the openings 40 in the bottom wall 34 of the container 24. Each corresponding cutout 56 in the first side wall 26, opening 40 in the bottom wall 34, and cutout 56 in the second side wall 28 is adapted to provide a separate access port to the cavity 38 of the housing 24.

As shown in FIGS. 2 and 3, the cutouts 56 in the side walls 26,28 of the container and the openings or voids 40 in the bottom wall 34 of the container are adapted to cooperate with the conductive members 18 in the cooking vessel 14. Specifically, the upper surface of the conductive members 18 contact the container 24 adjacent the openings 34 to position the container 24 within the bottom of the cooking vessel 14 of the grill 10. Preferably, the cutouts 56 are shaped to mate with the conductive members 18. When a plurality of openings 40 of the container are properly seated on a plurality of mating conductive members 18, the smoker assembly 22 is fixed in position in the cooking vessel 14. In the preferred embodiment illustrated in FIG. 2, the conductive members 18 are shaped like an inverted "V." Accordingly, the cutouts 56 of the preferred embodiment illustrated in FIG. 4 are shaped like an inverted "V" in order to mate with the conductive members 18. The conductive members 18 traverse in a horizontal direction, from one side of the grill to the other. Thus, the smoker attachment 22 is placed perpendicular across several of the conductive members 18 to properly seat the smoker attachment 22. When properly positioned, the smoker attachment 22 is adapted to mate with and contact the conductive members 18, and be supported by the surface of the conductive members 18 at the respective communicating cutouts 56 and openings 40. Generally, a portion of the mating conductive member 18 contacts the side walls 26,28 of the housing 24 adjacent the cutout 56 to support the housing 24 within the bottom chamber 14.

When the container 24 of the smoker attachment 22 is properly seated on the conductive members 18, a portion of the conductive members 18 passes through the cutout 56 and opening 40, and is positioned within the cavity 38 of the container 24 as is illustrated in FIG. 2. In the preferred embodiment, the outer surface of the side walls of the inverted "V" sear bars 18 are located within the cavity 38 between the side walls 26,28 of the container 24. As such, the portion of the conductive member 18 located within the cavity 38 directly contacts the smoker particles within the cavity 38 of the container 24. This provides for a surface of the conductive member in direct contact with the smoker particles to more quickly and efficiently heat the smoker particles. When a portion of the conductive member 18 is positioned within the cavity 38 as explained above, the volume of the cavity 38 is decreased, but the surface area of the conductive member 18 directly contacting the smoker particles is greatly increased.

Since the bottom wall 34 of the container 24 has several voids or openings 40, when positioned on the conductive members 18, not only is a portion of the perimeter of the cavity 38 (generally the lower surface of the cavity 38) defined by the conductive member 18 thereat, but additionally the surface of the conductive member defines a portion of the bottom wall 34 of the container 24 at the openings 40. In such a configuration, the conductive surface 60 of the conductive member 18 covers the void region 40 to define a portion of the bottom wall 34.

While the specific embodiments have been illustrated and described, numerous modifications come to mind without significantly departing from the spirit of the invention, and the scope of protection is only limited by the scope of the accompanying Claims.

We claim:

1. A smoker attachment for a barbecue grill, the barbecue grill having a bottom chamber with cooking grid, a bottom, a heat source located in the bottom chamber and a conductive member positioned between the heat source and the cooking grid, comprising:

a container having a plurality of sides and a bottom defining a cavity therebetween, the bottom of the container having an opening adapted to mate with a portion of the conductive member such that a portion of the conductive member is positioned within the cavity of the container to contact smoker particles within the container.

2. The smoker attachment of claim 1, further comprising a lid hingedly connected to a side of the container, the lid providing access to the cavity of the container when in an open position.

3. The smoker attachment of claim 2, wherein the lid has a plurality of apertures therein for allowing smoke generated from the smoker particles to escape out of the container and into the grill.

4. The smoker attachment of claim 1, further comprising a cutout in two of the sides of the container, the cutouts in the sides of the container communicating with the opening in the bottom of the container.

5. The smoker attachment of claim 4, wherein the cutouts in the side of the container and the opening of the bottom of the container are adapted to cooperate with the conductive member such that a portion of the conductive member is positioned within the cavity of the container, thereby decreasing a volume of the container and being adapted to contact the particles in the container.

6. A smoker attachment for a barbecue grill, the barbecue grill having a bottom chamber with an open top, a bottom, a heat source located proximal the bottom of the bottom chamber and a conductive member located above the heat source, comprising:

a container having a side wall, end wall, and bottom defining a cavity therein, the bottom of the container having an opening, the container adapted to have a portion of the conductive member contacting the container adjacent the opening to position the container within the bottom chamber of the barbecue grill, the container further adapted to have a portion of the conductive member pass through the opening of the container and into the cavity of the container to heat smoker particles within the container.

7. The smoker attachment of claim 6, wherein the bottom of the container comprises a plurality of substantially planar members, the planar members comprising a perforated material.

8. The smoker attachment of claim 6, further comprising a plurality of openings in the bottom of the container, the openings adapted to have a portion of the conductive member pass through the opening and into the cavity of the container.

9. The smoker attachment of claim 6, further comprising a lid hingedly connected to the container, the lid providing access to the cavity of the container when in an open position, the lid further having a plurality of openings therein for allowing smoke generated from the smoker particles to escape from the smoker attachment when the lid is in a closed position.

10. The smoker attachment of claim 6, wherein the container further comprises opposing side walls, the side walls having corresponding cutouts which communicate with opening in the bottom of the container, and wherein the smoker attachment is adapted to contact the conductive member and be supported by the conductive member at the communicating cutouts and opening.

11. A smoker attachment for a gas barbecue grill, the barbecue grill having a bottom chamber having a cooking grid, a burner assembly, and a conductive member between the burner assembly and the cooking grid, comprising:

a housing having a plurality of side walls and a bottom wall defining a cavity therein, wherein the bottom wall of the housing has an opening providing access to the cavity of the housing, and wherein the housing is adapted to have a portion of a perimeter of the cavity defined by the conductive member located within the opening of the bottom wall of the housing.

12. The smoker attachment of claim 1, further comprising a first and second side wall, and a first and second end wall adjacent the side walls, wherein the first and second side walls have a cutout adjacent the bottom wall of the housing, and wherein the cutouts in the first and second side walls mate with the opening in the bottom wall.

13. The smoker attachment of claim 12, further comprising a plurality of openings in the bottom wall, a corresponding plurality of cutouts in the first side wall cooperating with the plurality of openings in the bottom wall, and a corresponding plurality of cutouts in the second side wall cooperating with the plurality of openings in the bottom wall, such that each corresponding cutout in the first side wall, opening in the bottom wall, and cutout in the second side wall is adapted to provide a separate access port to the cavity of the housing for a different conductive member, and wherein the housing is adapted to have a portion of the bottom wall at each opening thereof defined by the conductive member located thereat.

14. The smoker attachment of claim 13, further comprising a lid hingedly connected to the housing, the lid providing access to the cavity of the housing when in an open position, the lid further having a plurality of openings therein for allowing smoke generated from the smoker particles to escape from the smoker attachment when the lid is in a closed position.

15. A smoker attachment for a gas barbecue grill, the barbecue grill having a bottom chamber with a cooking grid, a plurality of burner tubes, and a plurality of inverted "V" shaped sear bars located between the cooking grid and the burner tubes, the smoker attachment comprising:

a substantially rectangular housing having first and second opposing end walls, first and second opposing side walls adjacent the first and second opposing end walls, and a bottom wall connected to the end walls and the side walls, wherein a cavity is defined by the space within the housing between the opposing end walls, opposing side walls, and bottom wall, wherein the first side wall has a plurality of cutouts adjacent a bottom thereof, and wherein the second side wall has a plurality of cutouts adjacent a bottom thereof, the cutouts in the first side wall corresponding with the cutouts in the second side wall, wherein the bottom wall has a plurality of openings therethrough such that a plurality of the corresponding cutouts in the side walls are adjacent a plurality of the openings in the bottom wall, wherein the combination of at least one of the corresponding cutouts and openings is adapted to mate with a surface of one of the conductive members such that a portion of the mating conductive member contacts the side walls of the housing adjacent the cutout to support the housing within the bottom chamber, and wherein the housing is adapted to allow a portion of the conductive member to be positioned within the opening of the housing to define a lower surface of the cavity for contact and heating smoker particles within the housing.

16. A smoker attachment for an outdoor cooking device having a cooking grid, a burner assembly, and a conductive member between the burner assembly and the cooking grid, comprising:

a housing having a plurality of side walls and a bottom wall defining a cavity therein, wherein the bottom wall of the housing has an opening providing access to the cavity of the housing, and wherein the housing is adapted to have a surface of the conductive member define a portion of the bottom wall of the housing.

17. A smoker attachment for a barbecue grill having a bottom chamber with a heat source and a conductive member located above the heat source, the conductive member having a conductive surface, comprising:

a container having a plurality of side walls and a bottom defining an inner cavity, the bottom being defined by a bottom wall having a void region adapted to mate with the conductive surface to cover the void region.

* * * * *